J. G. HALL.
BOOK.
APPLICATION FILED JAN. 16, 1922.

1,426,291.

Patented Aug. 15, 1922.

Inventor.
J. G. Hall.
By Acker & Totten
Attorneys.

UNITED STATES PATENT OFFICE.

JAMES G. HALL, OF BURLINGAME, CALIFORNIA.

BOOK.

1,426,291.   Specification of Letters Patent.   Patented Aug. 15, 1922.

Application filed January 16, 1922. Serial No. 529,547.

*To all whom it may concern:*

Be it known that I, JAMES G. HALL, a citizen of the United States, residing at Burlingame, in the county of San Mateo and State of California, have invented certain new and useful Improvements in Books, of which the following is a specification.

This invention relates to a map or guide in a convenient folded or book form, enabling the ready examination of the map or guide without unfolding the entire sheet and spreading the same, as is the present custom.

The present invention has for its principal object to provide a map or guide folded into a small compass and arranged in connected sections, each in page form, foldable centrally on right angle creases, enabling the ready reference to section and page when it is desired to locate any particular place on the map or guide.

By my present invention, the permanent folded arrangement of the sections and the dividing of the same into pages affords a support or rest for the various section leaves or pages, enabling but a small portion of the entire map or guide to be exposed in locating any desired point thereon or in following any road or indicated path. Another of the important and essential objects is to provide a map or guide folded in book form and adapted to be carried in the pocket and for use by aviators when flying or motorists when touring without exposing a great area of the map to the wind action, thereby enabling the easy examination of any desired portion or page without the wind interfering with the reading thereof. A further object is the folding of a relatively large map or guide into a small compass in such manner that the contiguous portions of the map or guide are contained on adjacent pages and are capable of examination by the folding of the pages on the intersecting creased lines.

With the above mentioned and other objects in view, the invention consists in the novel construction and combination of parts hereinafter described, illustrated in the accompanying drawings and pointed out in the claim hereto appended; it being understood that various changes in the form, proportion, size and minor details of construction within the scope of the claim may be resorted to without departing from the spirit or sacrificing any of the advantages of the invention.

To more clearly comprehend the invention, reference is directed to the accompanying drawings, wherein:—

Figure 1:
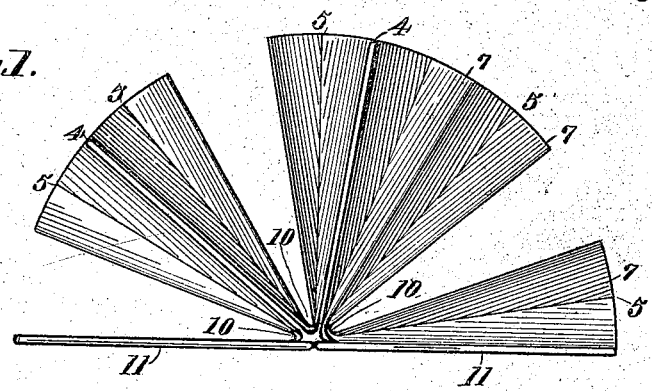
Figure 1 is a view in top plan of a map folded into three connected sections in accordance with my invention, illustrating the back or cover secured to the terminal edges thereof, forming a book.
Figure 2:
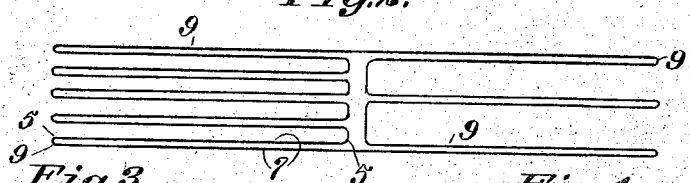
Figure 2 is an edge view of the map between adjacent sections, illustrating the manner of folding the same in forming the leaves.
Figure 3:
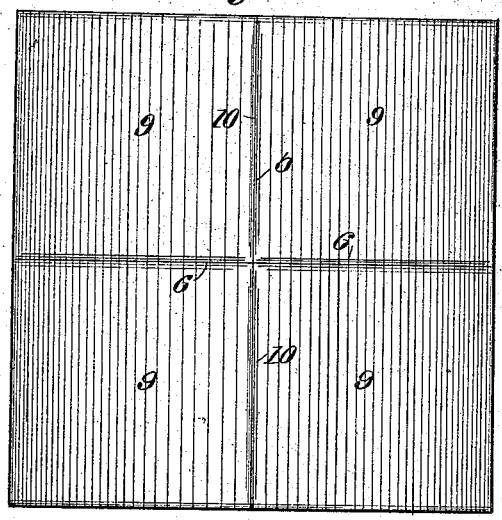
Figure 3 is a view in elevation of one of the leaves, illustrating the intersecting creases therein.
Figure 4:
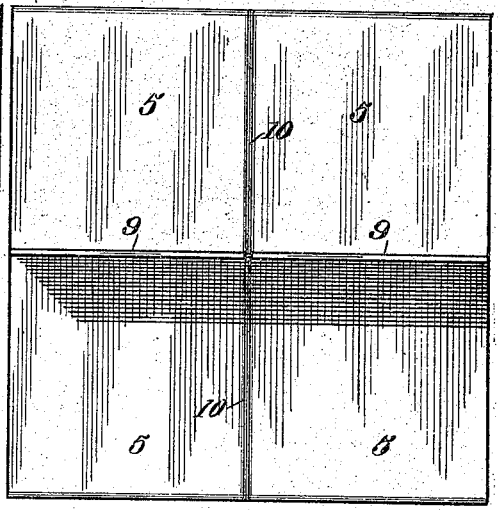
Figure 4 is a view in elevation of one of the sectors illustrating one of the leaves in raised position.
Figure 5:
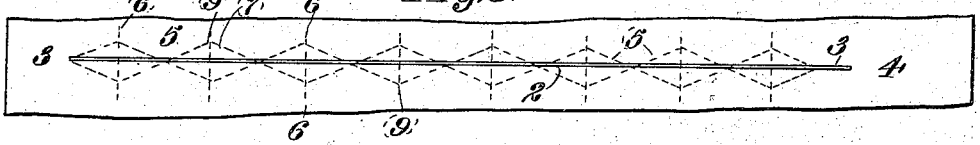
Figure 5 is a fragmentary view in detail plan of the map or guide illustrating one of the cuts or slots therein and the direction of folding the body at either side thereof.

In the drawings, wherein like characters of reference designate corresponding parts throughout the several views, 1 indicates a sheet provided on one face or surface with map or guide matter as desired, and the same in providing the connected sections is cut or slit vertically as at 2, the cut terminating short of the upper and lower edges of the sheet providing section connecting or hinged portions 3 and 4 at the opposite ends of each cut. The vertical cuts are located at uniform distances from each other to provide a plurality of leaf forming sections 5 of uniform width and extending vertically of the sheet 1 from top to bottom. The vertical sections 5, between the vertical slots or cuts 2 are creased transversely on parallel lines as at 6 causing the under surface of the folds 7 to contact, each forming a leaf 9. The contacting surfaces of the folds 7 are adhesively secured together in any suitable manner providing a series of leaves disposed transversely of each section 5. After being folded, the vertical sections 5 are longitudinally creased in their center as at 10, so that the opposite halves of the faces will fold into contact, and the connecting or hinge portions 3 and 4 providing adjacent sections are creased to permit the backs of adjacent halves of adjoining strips to lie back to back. The sections may be carried out to any number dependent on their width and the width of the sheet, and the leaves may be carried out to any number dependent also on their width and the depth of the sheet.

The rear surface of the top and bottom folds 7 at their extreme opposite side edges of the sheet are adhesively or otherwise secured or attached to the inner surface of the hinged cover members 11, thus when the cover is closed the folded map or guide is in book form and to examine the same it is only necessary to turn the half sections on the longitudinal creases 10 to refer from one section to the other, and, when the desired section is located, to turn the transverse leaves 9 on their hinges to expose the desired spot on the map or guide.

It will be observed that the leaves of any selected section contain a vertical strip of the map or guide, and that the portion of the map or guide at either side of any selected portion on the leaf may be located by turning to the adjacent section and turning the leaves thereof until the corresponding leaf of the adjacent section is exposed.

Having thus described my invention, what I claim as new and desire to protect by Letters Patent of the United States is:—

A book consisting of a sheet divided vertically into a plurality of sections connected at their opposite ends, each of said sections being folded transversely to provide a plurality of outwardly extended hinged leaves, said sections being centrally creased vertically through said leaves to provide half portions adapted to fold face to face, said section connecting portions of the sheet being vertically creased to permit corresponding half portions of adjacent sections to fold back to back, and a cover to which the terminal end portions of the top and bottom of said sheet are attached.

In testimony whereof I have signed my name to this specification.

JAMES G. HALL.